United States Patent
Simms, II

(10) Patent No.: US 7,866,358 B1
(45) Date of Patent: Jan. 11, 2011

(54) ADJUSTABLE COOKING EQUIPMENT COVER

(76) Inventor: John Lee Simms, II, 10 Brookhaven Dr., NE., Atlanta, GA (US) 30319

( * ) Notice: Subject to any disclaimer, the term of this patent is extended or adjusted under 35 U.S.C. 154(b) by 1431 days.

(21) Appl. No.: 11/027,787

(22) Filed: Dec. 31, 2004

(51) Int. Cl.
*B65D 65/08* (2006.01)

(52) U.S. Cl. .................. 150/165; 150/154; 126/201

(58) Field of Classification Search ......... 150/154–165, 150/166; 126/50, 221, 276, 201
See application file for complete search history.

(56) References Cited

U.S. PATENT DOCUMENTS

| | | | | |
|---|---|---|---|---|
| 2,787,311 | A * | 4/1957 | Cohen | 150/166 |
| 2,917,094 | A * | 12/1959 | Sullivan | 150/166 |
| 3,022,808 | A * | 2/1962 | Silver | 150/154 |
| 3,202,193 | A * | 8/1965 | Ware | 383/37 |
| 3,320,996 | A * | 5/1967 | Singer | 150/165 |
| 4,197,832 | A * | 4/1980 | Thomas et al. | 126/390.1 |
| 4,745,769 | A * | 5/1988 | Wooden, Jr. | 62/259.1 |
| 4,968,085 | A * | 11/1990 | Stann | 296/100.16 |
| 5,386,604 | A | 2/1995 | Ricketts | |
| 5,455,970 | A * | 10/1995 | Vance et al. | 2/171.04 |
| 5,598,946 | A * | 2/1997 | Davis | 220/739 |
| 5,829,343 | A * | 11/1998 | Sunshine | 99/432 |
| 6,058,658 | A * | 5/2000 | Dunn | 52/23 |
| 6,296,618 | B1 | 10/2001 | Gaber | |
| 6,328,083 | B1 | 12/2001 | Esterson | |
| 6,506,471 | B2 * | 1/2003 | Doppelt | 428/102 |
| 6,619,920 | B1 | 9/2003 | Cannon | |
| 6,725,893 | B1 * | 4/2004 | Erickson | 150/154 |
| 6,863,100 | B2 * | 3/2005 | Neal et al. | 150/165 |
| 6,964,447 | B2 * | 11/2005 | McNamee | 296/136.07 |
| 7,093,699 | B2 * | 8/2006 | Yu | 190/26 |
| 7,152,733 | B2 * | 12/2006 | Trickett | 206/320 |
| 2002/0189730 | A1 * | 12/2002 | Garofalo et al. | 150/154 |
| 2004/0016484 | A1 * | 1/2004 | Muller | 150/158 |
| 2004/0016485 | A1 * | 1/2004 | Muller | 150/158 |
| 2004/0255926 | A1 * | 12/2004 | Waits et al. | 126/25 R |
| 2005/0066957 | A1 * | 3/2005 | MacLean | 126/201 |
| 2006/0090824 | A1 * | 5/2006 | Kreft | 150/154 |
| 2006/0232095 | A1 * | 10/2006 | Sedighzadeh | 296/98 |
| 2007/0283946 | A1 * | 12/2007 | Maruzzo et al. | 126/50 |

OTHER PUBLICATIONS

U.S. Appl. No. 10/159,336, filed Dec. 5, 2002, Neal.

* cited by examiner

*Primary Examiner*—Sue A Weaver
(74) *Attorney, Agent, or Firm*—Gardner Groff Greenwald & Villanueva, PC

(57) ABSTRACT

An adjustable cooking equipment cover is provided that includes a flexible material configured to fit a first configuration of cooking equipment to a desired specification and one or more connectors attached to the flexible material that can be connected together to reconfigure the flexible material to fit a second configuration of cooking equipment to the same desired specification.

10 Claims, 5 Drawing Sheets

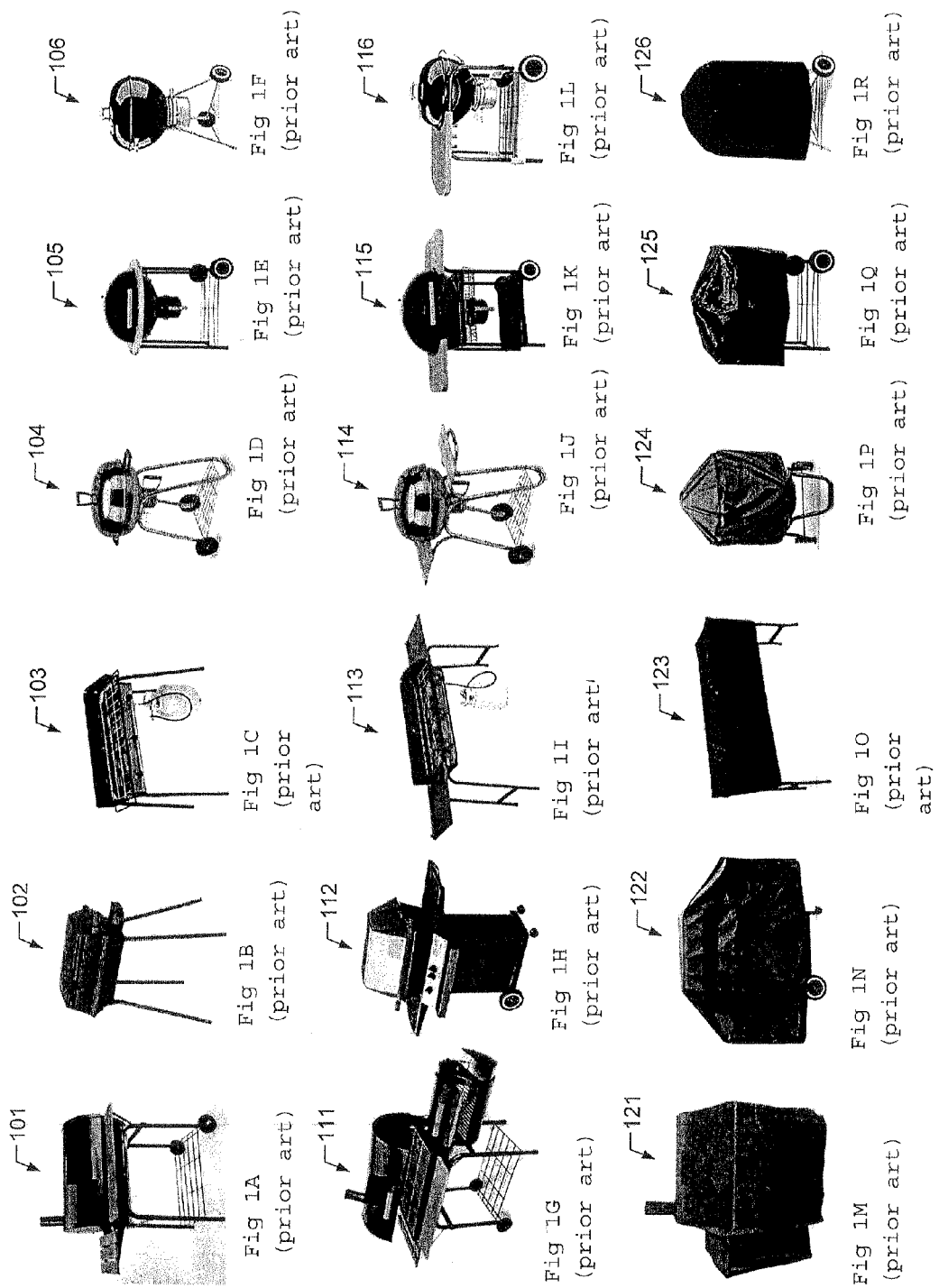

ADJUSTABLE COOKING EQUIPMENT COVER

TECHNICAL FIELD

The present invention generally relates to cooking equipment covers, and more particularly, to an adjustable cooking equipment cover.

BACKGROUND OF INVENTION

Cooking equipment, such as barbecue grills, smokers, portable stoves, etc., is available in many configurations, such as various types, styles, shapes, sizes, etc. (see e.g., FIG. 1A, which will be discussed further below). Furthermore, a particular configuration of cooking equipment may also have numerous alternate configurations, for example, by the addition or removal of additional (e.g., "add-on") components such as one or more shelves, fireboxes, storage bins, etc. (see e.g., FIG. 1B, which will also be discussed further below).

A cover may be available for cooking equipment such as that described above (see e.g., FIG. 1C, which will also be discussed further below). Such covers may provide many benefits, such as to protect the cooking equipment from the accumulation of moisture, dirt, debris, etc., for example, when it is not in use and/or in storage. As another example, such covers for cooking equipment may also provide the benefit of making the cooking equipment more aesthetically pleasing, for example, when it is not in use and/or stored in an open area such as a room, patio, deck, etc.

However, existing approaches to cooking equipment covers are typically limited because the covers are made to appropriately fit (e.g., to a desired specification) only a particular configuration (i.e., type, style, shape, size, etc.) of cooking equipment (e.g., as shown in FIG. 1C). Thus, in accordance with such existing approaches, one cooking equipment cover may be configured to fit only a cylindrical shaped smoker while another cover may be configured to fit only a rectangular shaped portable stove. As another example of the limitations of existing approaches, one existing cooking equipment cover may be configured to fit only a kettle shaped grill without any add-on components while another existing cover is only configured to fit a kettle shaped grill further configured with an add-on shelf component. As yet another example of such limitations, one existing cover may be configured to fit only a small circular shaped grill while another existing cover may be configured to fit only a large circular shaped grill. Furthermore, according to some existing approaches, the covers may have a "one-size-fits-all" configuration and, thus, may fit some cooking equipment too loosely (e.g., being too long, too wide, etc.) and other cooking equipment too tightly (e.g., being too short, too narrow, etc.) or not at all. Thus, existing approaches to cooking equipment covers are typically limited to appropriately fitting only one configuration of cooking equipment.

In light of the foregoing limitations of existing approaches to cooking equipment covers, a need in the art exists for an adjustable cooking equipment cover. Such an adjustable cooking equipment cover should be adjustable to appropriately fit (e.g., to a desired specification) one or more configurations (e.g., types, styles, shapes, sizes, etc.) of cooking equipment and/or a particular configuration of cooking equipment alone or with one or more additional (e.g., add-on) components (e.g., one or more shelves, fireboxes, storage bins, etc.).

SUMMARY OF INVENTION

The invention, in accordance with exemplary embodiments described herein, provides an adjustable cooking equipment cover. In a general embodiment, the adjustable cooking equipment cover can include a flexible material configured to fit a first configuration of cooking equipment to a desired specification. The adjustable cooking equipment cover can further include a first connector and a second connector that are attached to the flexible material. The flexible material of the adjustable cooking equipment cover can be reconfigured to fit a second configuration of cooking equipment to the same desired specification when the first connector is connected to the second connector.

In accordance with exemplary embodiments of the invention, the adjustable cooking equipment cover can be adjusted to appropriately fit (e.g., to a desired specification) one or more configurations (e.g., types, styles, shapes, sizes, etc.) of cooking equipment and/or a particular configuration of cooking equipment alone or with one or more additional (e.g., add-on) components (e.g., one or more shelves, fireboxes, storage bins, etc.).

BRIEF DESCRIPTION OF THE DRAWINGS

FIGS. 1A through 1R show various exemplary configurations of prior art cooking equipment that can be covered in accordance with exemplary embodiments of the invention.

DETAILED DESCRIPTION OF EXEMPLARY EMBODIMENTS OF THE INVENTION

Figure 2A:
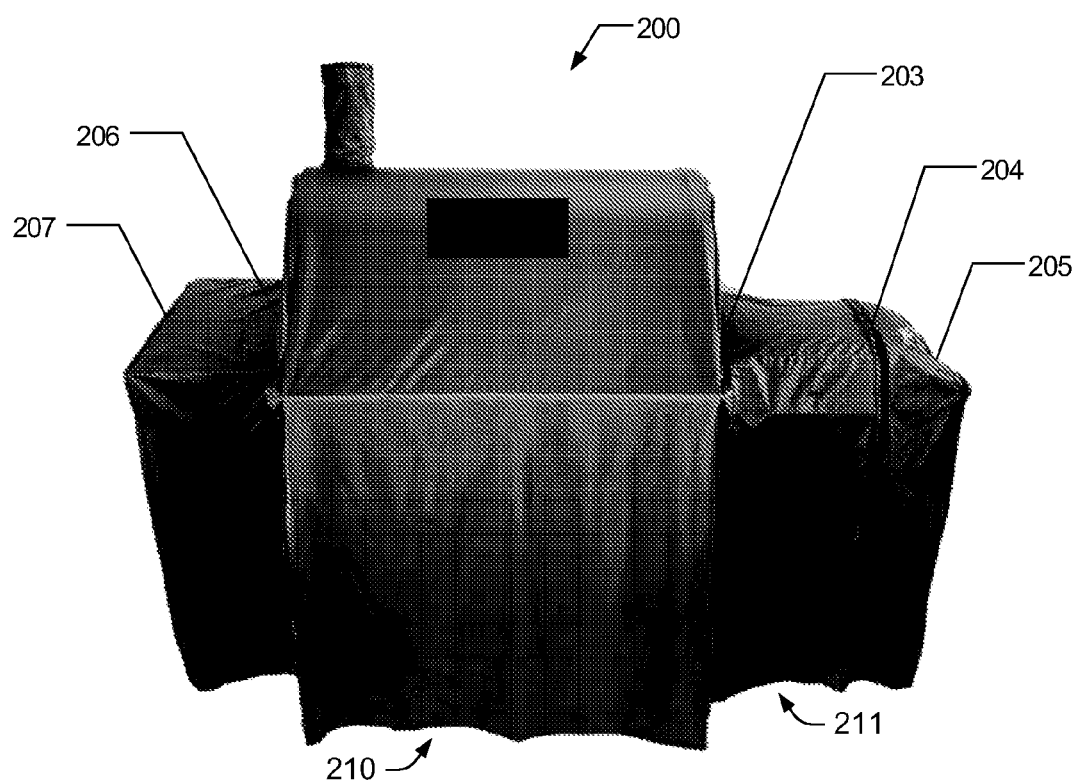
FIGS. 2A and 2B show exemplary views of an adjustable cooking equipment cover in accordance with exemplary embodiments of the invention.

Exemplary embodiments of the invention will be described hereinafter with reference to the drawings, in which like reference numerals may represent like elements throughout the several figures. In that regard, FIGS. 1A-1F show various exemplary configurations of cooking equipment 101-106 that can be covered in accordance with exemplary embodiments of the invention. As shown in FIGS. 1A-1F, such cooking equipment 101-106 may be of various types, styles, shapes, sizes, etc. (i.e., various configurations). For example, the cooking equipment may be a type of grill (e.g., 102, 104-106), smoker (e.g., 101), or portable stove (e.g., 103). As another example, the cooking equipment may cook using fuels such as charcoal (e.g., 101, 102, 104-106), wood (e.g., 101, 102), or gas (e.g., 102, 103). The exemplary cooking equipment may also be configured in various shapes, such as cylindrical-shaped (e.g., 101), rectangular-shaped (e.g., 102, 103), round-shaped (e.g., 104, 105), or kettle-shaped (e.g., 106). Moreover, the cooking equipment may have various sizes, such as large-sized (e.g., 101-103), medium-sized (e.g., 105-106), or small-sized (e.g., 104). Cooking equipment that can be covered in accordance with exemplary embodiments of the invention, such as the exemplary cooking equipment 101-106, may have many other variations in addition to those discussed above.

Another example of the numerous variations that cooking equipment may have that can be covered in accordance with exemplary embodiments of the invention is various alternate configurations, for example, by the addition or removal of additional (e.g., "add-on") components, such as one or more shelves, fireboxes, storage bins, etc. In that regard, FIGS. 1G-1L show various alternate exemplary configurations 111-116 of the cooking equipment shown in FIGS. 1A-1F that can also be covered in accordance with exemplary embodiments of the invention. For example, the alternate exemplary configurations of cooking equipment may include one or more shelves (e.g., 111-116), fireboxes (e.g., 111), or storage bins (e.g., 112, 115, 116). Moreover, such exemplary add-on components may also have various configurations (e.g., types, styles, shapes, sizes, etc.). Thus, alternate configurations of cooking equipment that can be covered in accordance with exemplary embodiments of the invention, such as the alternate exemplary configurations of cooking equipment 111-116, may also have many other variations in addition to those discussed above.

The foregoing exemplary cooking equipment discussed with respect to FIGS. 1A-1L can be covered with covers that are configured to fit a particular configuration of such cooking equipment. In that regard, FIGS. 1M-1R show various exemplary configurations of the cooking equipment shown in FIGS. 1A-1L covered by exemplary configurations of cooking equipment covers 121-126. As shown in FIGS. 1M-1R, the exemplary covers 121-126 are typically limited to appropriately fit (e.g., to a desired specification) only one configuration of cooking equipment. For example, the exemplary smoker cover 121 is configured to appropriately fit one configuration of smoker 101, but not another configuration of smoker 111 that includes an add-on firebox and additional shelf. As another example, the exemplary portable stove cover 123 is configured to appropriately fit one configuration of portable stove 103, but not another configuration of portable stove 113 that includes two side shelves. As yet another example, the exemplary grill cover 122 is configured to appropriately fit one configuration of grill 112 that includes two side shelves, but not another configuration of grill 102 that does not include shelves. Thus, typical cooking equipment covers, such as the exemplary covers 121-126, are usually limited to appropriately fit only one particular configuration of cooking equipment and when such covers are applied in an attempt to cover other configurations of cooking equipment, they may, for example, fit too loosely, too tightly, or not at all.

In light of the above discussed limitations of typical cooking equipment covers, such as the exemplary covers 121-126, exemplary embodiments of the invention provide an adjustable cooking equipment cover that is adjustable to appropriately fit (e.g., to a desired specification) one or more configurations (e.g., types, styles, shapes, sizes, etc.) of cooking equipment and/or a particular configuration of cooking equipment alone or with one or more additional (e.g., add-on) components (e.g., one or more shelves, fireboxes, storage bins, etc.). Hereinafter, such variations of cooking equipment as the foregoing will be collectively referred to as "configurations" to facilitate the description of exemplary embodiments of the invention. In that regard, FIGS. 2A and 2B show exemplary views of an adjustable cooking equipment cover 200 in accordance with exemplary embodiments of the invention.

Before proceeding with the description of exemplary embodiments of the invention, such as the exemplary adjustable cover 200, it should be understood that an "appropriate fit" can refer to any desired specification, manner, preference, etc. for a cover, such as the adjustable cover 200, to fit to a configuration of cooking equipment. For example, an appropriate fit of the adjustable cover 200 may occur when the adjustable cover 200 covers one or more surfaces of a configuration of cooking equipment in a desired manner. Typically, an appropriate fit of a cover (such as the adjustable cover 200) to a configuration of cooking equipment occurs when the top and side surfaces of the cooking equipment are covered and the cover drapes upon or at some distance above the supporting surface of the cooking equipment (such as the ground, a floor, a patio or deck surface, etc.). For example, as discussed above, FIGS. 1M-1R show various configurations of cooking equipment covers 121-126 that have an appropriate fit to a particular configuration of cooking equipment. Furthermore, a cover with an appropriate fit to a configuration of cooking equipment typically covers the cooking equipment securely (e.g., with few or no gathers, wrinkles, sags, etc.) and/or without being too tightly or too loosely fitting on the cooking equipment, as also depicted by the exemplary covers 121-126 shown in FIGS. 1M-1R.

However, an "appropriate fit" of a cover to a configuration of cooking equipment can be any desired specification (manner, preference, etc.) of fit that is consistently applied to any configuration of cooking equipment. Thus, for example, the appropriate fit depicted by the cover 122 when it covers one configuration of cooking equipment (e.g., 112) in FIGS. 1M-1R would not occur if the cover 122 was used to cover another configuration of cooking equipment (e.g., 102). As discussed below, however, an adjustable cooking equipment cover in accordance with exemplary embodiments of the invention can be adjusted to appropriately fit more than one particular configuration of cooking equipment.

Figure 2B:
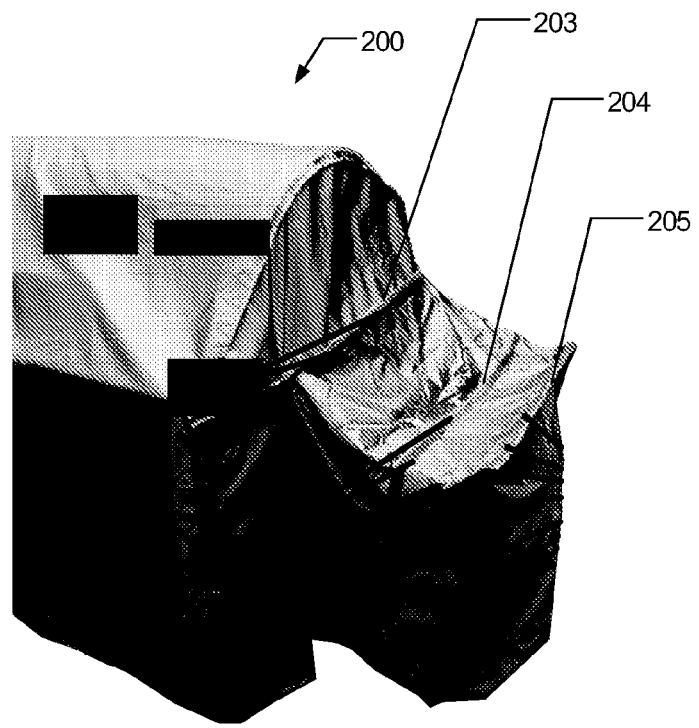

The adjustable cooking equipment cover 200 in FIGS. 2A and 2B is depicted for exemplary purposes covering a configuration of cooking equipment such as the smoker 111 discussed in FIGS. 1G-1L, which includes additional components such as a side shelf and a side firebox. In other words, the cover 200 can include a first compartment 210 that covers the smoker and a second compartment 211 that covers a side shelf or side firebox. However, as discussed above, it should be understood that an adjustable cooking equipment cover in accordance with exemplary embodiments of the invention can be used to cover cooking equipment with various other configurations as well. The adjustable cooking equipment cover 200 is typically constructed of one or more materials that allow the cover 200 to be reconfigured to fit various configurations of cooking equipment. For example, the adjustable cover 200 can be constructed of one or more materials that are generally flexible in nature such as cloth-based, plastic-based, paper-based, and/or metallic-based materials. Such materials may be natural (e.g., cotton or paper) and/or synthetic (e.g., nylon or plastic) in nature. Typically, the adjustable cover 200 is constructed of one or more materials that provide the cover 200 with various desirable qualities such as flexibility, durability, moisture resistance, pleasing aesthetics, etc.

The adjustable cooking equipment cover 200 typically includes one or more "connectors" 203-207 that are attached (embedded, integrated, connected, etc.) to the one or more materials of the adjustable cover 200. These connectors 203-207 can be used to reconfigure the adjustable cooking equipment cover 200 to appropriately fit one or more configurations of cooking equipment, such as the exemplary cooking equipment described above in FIGS. 1A-1L. The connectors 203-207 may be any item, apparatus, device, system, etc., that can be used to reconfigure one or more sections of the adjustable cooking equipment cover 200 to a different shape, size, style, etc. For example, the connectors 203-207 may include one or more connector (fastener, closure, etc.) devices such as Velcro® fasteners, snaps, buttons, zippers, hook-and-loop fasteners, ball-and-loop fasteners, ties, laces, screw-type fasteners, magnetic fasteners, reusable adhesive fasteners, track-and-channel fasteners, etc. Typically, the connectors 203-207 can be connected and disconnected repeatedly so that the configuration of the adjustable cover 200 can be changed as needed to appropriately fit various configurations of cooking equipment.

Figure 3:
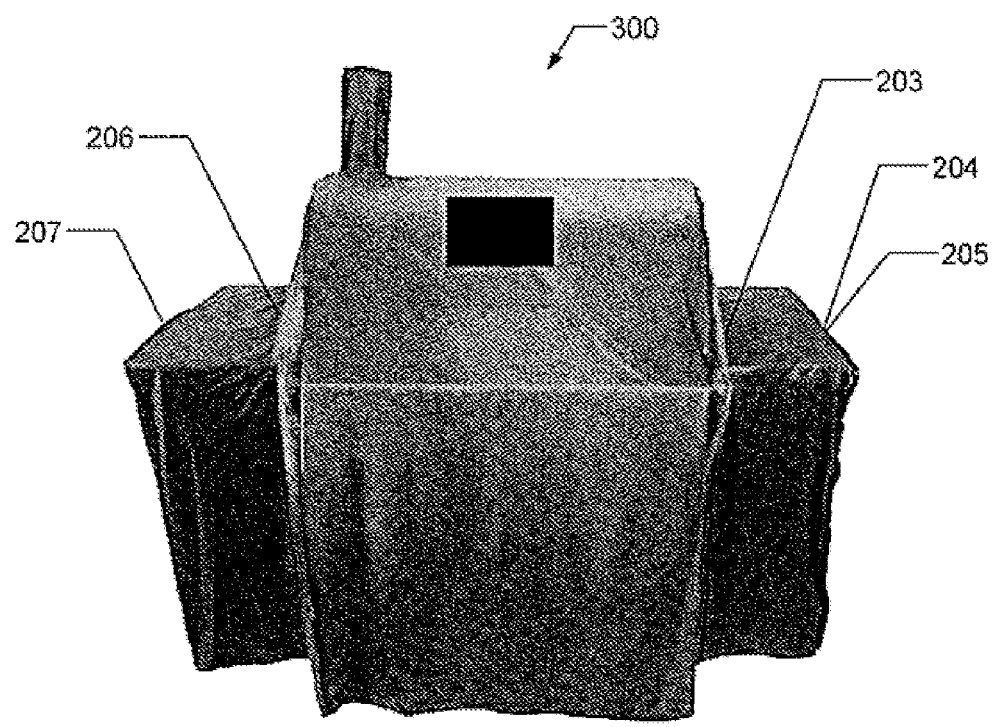
FIG. 3 shows an exemplary view of the adjustable cooking equipment cover shown in FIGS. 2A and 2B in a first alternate configuration in accordance with exemplary embodiments of the invention.

As shown if FIGS. 2A and 2B, the connectors 203-207 can be disconnected so that the adjustable cooking equipment cover 200 can appropriately fit the smoker 111 with the add-on side shelf and firebox. However, one or more of the connectors 203-207 can be connected together so that the adjustable cover 200 can appropriately fit another configuration of the smoker 111. In that regard, FIG. 3 shows an exemplary view of the adjustable cooking equipment cover shown in FIGS. 2A and 2B in a first alternate configuration 300 in accordance with exemplary embodiments of the invention. In this exemplary alternate configuration of the adjustable cover 300, two of the connectors 204, 205 are connected together to reconfigure the adjustable cover to appropriately fit a smoker with two add-on side shelves and no side firebox (e.g., an alternate configuration of the smoker 101, 111). The remaining connectors 203, 206, 207 are left unconnected in this alternate configuration 300. In this regard, the two connectors 204 and 205 may span a portion of the cover material and be configured to connect to each other in accordance with exemplary embodiments of the invention. For example, if the connectors 204, 205 are Velcro® fasteners, one connector 204 may be a "hook" section of a Velcro® fastener and the other connector 205 may be a "loop" section of a Velcro® fastener, so that the two connectors 204, 205 can connect together when brought into contact with each other. As another example, if the connectors 204, 205 include one or more snaps, the one connector 205 could include one or more "female" portions of a snap and the other connector 204 could include one or more "male" portions of a snap, so that the two connectors 204, 205 can connect together when brought into contact with each other (e.g., "snapped" together). Similar connections can be implemented if the connectors 204, 205 include other configurations of connector (fastener, closure, etc.) devices (apparatuses, systems, etc.), such as those discussed above, to obtain the alternate configuration of the adjustable cover 300.

Figure 4:
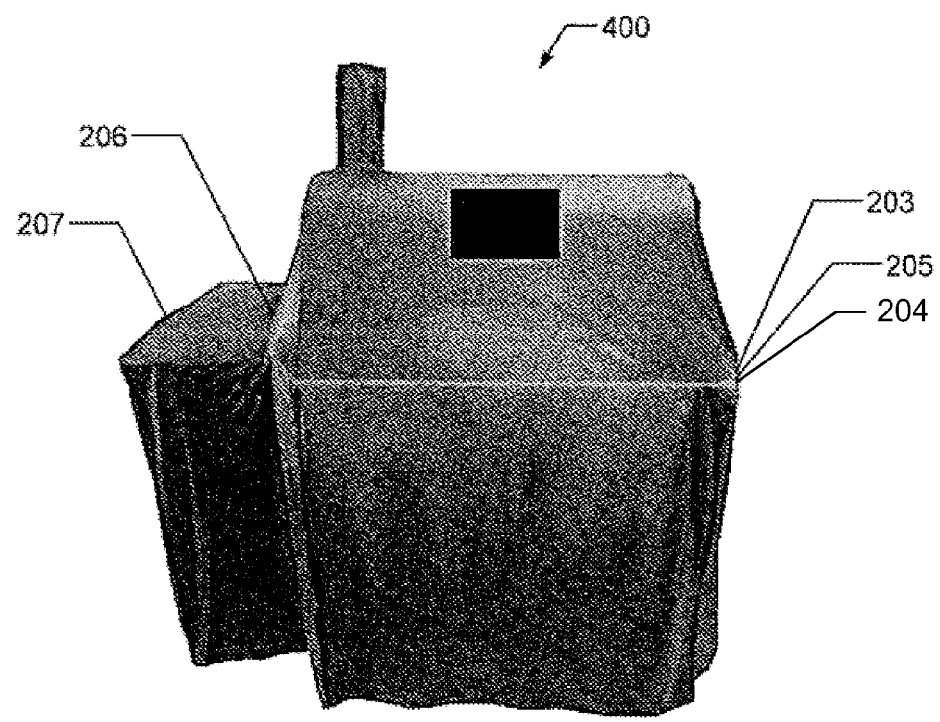
FIG. 4 shows an exemplary view of the adjustable cooking equipment cover shown in FIGS. 2A and 2B in a second alternate configuration in accordance with exemplary embodiments of the invention.

As another example of how the adjustable cooking equipment cover 200 of FIGS. 2A and 2B can be reconfigured, FIG. 4 shows an exemplary view of the adjustable cooking equipment cover 200 in a second alternate configuration 400 in accordance with exemplary embodiments of the invention. In this second alternate exemplary configuration of the adjustable cover 400, two of the connectors 203, 205 are connected together to reconfigure the adjustable cover to appropriately fit a smoker with a single add-on side shelf (e.g., the smoker 101, which is another alternate configuration of the smoker 111). The remaining connectors 204, 206, 207 are left unconnected in this other alternate configuration 400. The connector 204 can be neatly gathered up in the material between the connectors 203, 205 in this configuration 400 to facilitate the appropriate fit to the smoker 101. Furthermore, the connectors 203, 205 can have a similar connective characteristic as that described above with respect to the connectors 204, 205 in order to obtain the alternate configuration of the adjustable cover 400.

Figure 5:
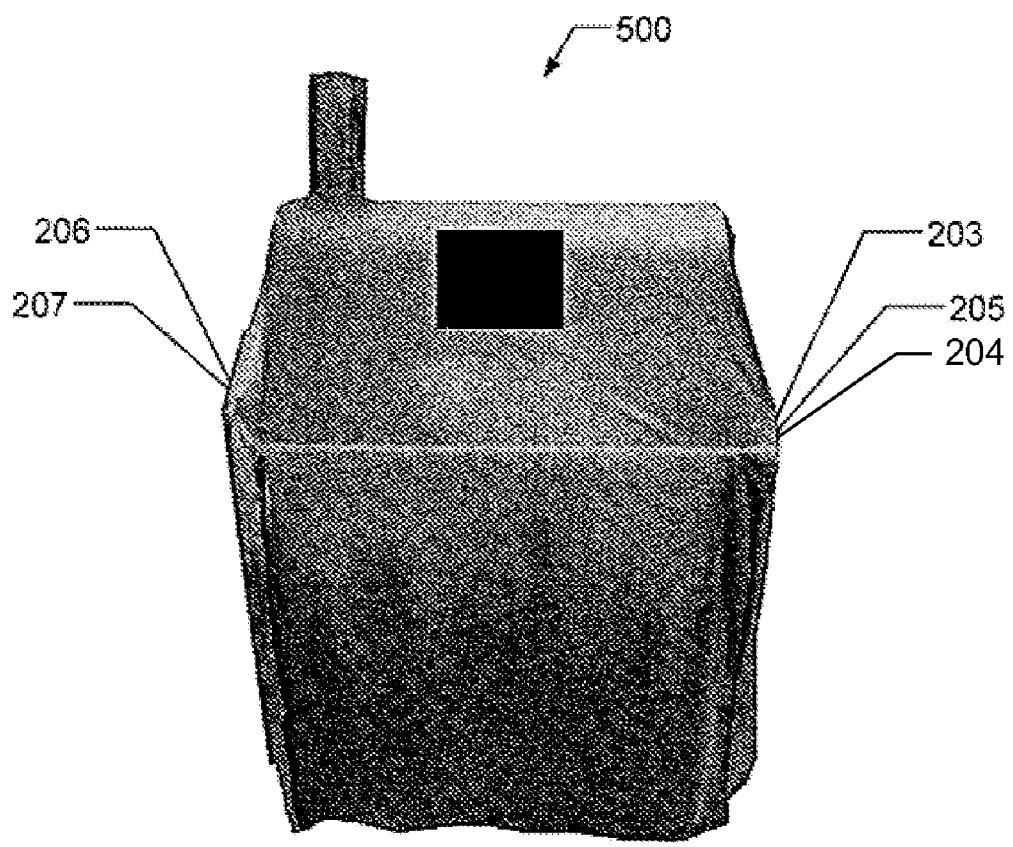
FIG. 5 shows an exemplary view of the adjustable cooking equipment cover shown in FIGS. 2A and 2B in a third alternate configuration in accordance with exemplary embodiments of the invention.

FIG. 5 shows another example of how the adjustable cooking equipment cover 200 of FIGS. 2A and 2B can be reconfigured into a third alternate configuration 500 in accordance with exemplary embodiments of the invention. In this third alternate exemplary configuration of the adjustable cover 500, four of the connectors 203, 205 and 206, 207, respectively, are connected together to reconfigure the adjustable cover to appropriately fit a smoker without any add-on components (e.g., an alternate configuration of the smoker 101, 111). Similar to the alternate configuration 400 of FIG. 4, the connector 204 can be neatly gathered up in the material between the connectors 203, 205 in this configuration 500 to facilitate the appropriate fit to the smoker. Furthermore, the connectors 203, 205 and 206, 207, respectively, can have a similar connective characteristic as that described above with respect to the connectors 204, 205 in FIG. 3 in order to obtain the alternate configuration of the adjustable cover 500. For example, if the connectors 206, 207 are Velcro® fasteners, one connector 206 may be a "hook" section of a Velcro® fastener and the other connector 207 may be a "loop" section, so that the two connectors 206, 207 can connect together when brought into contact with each other.

Figure 6:
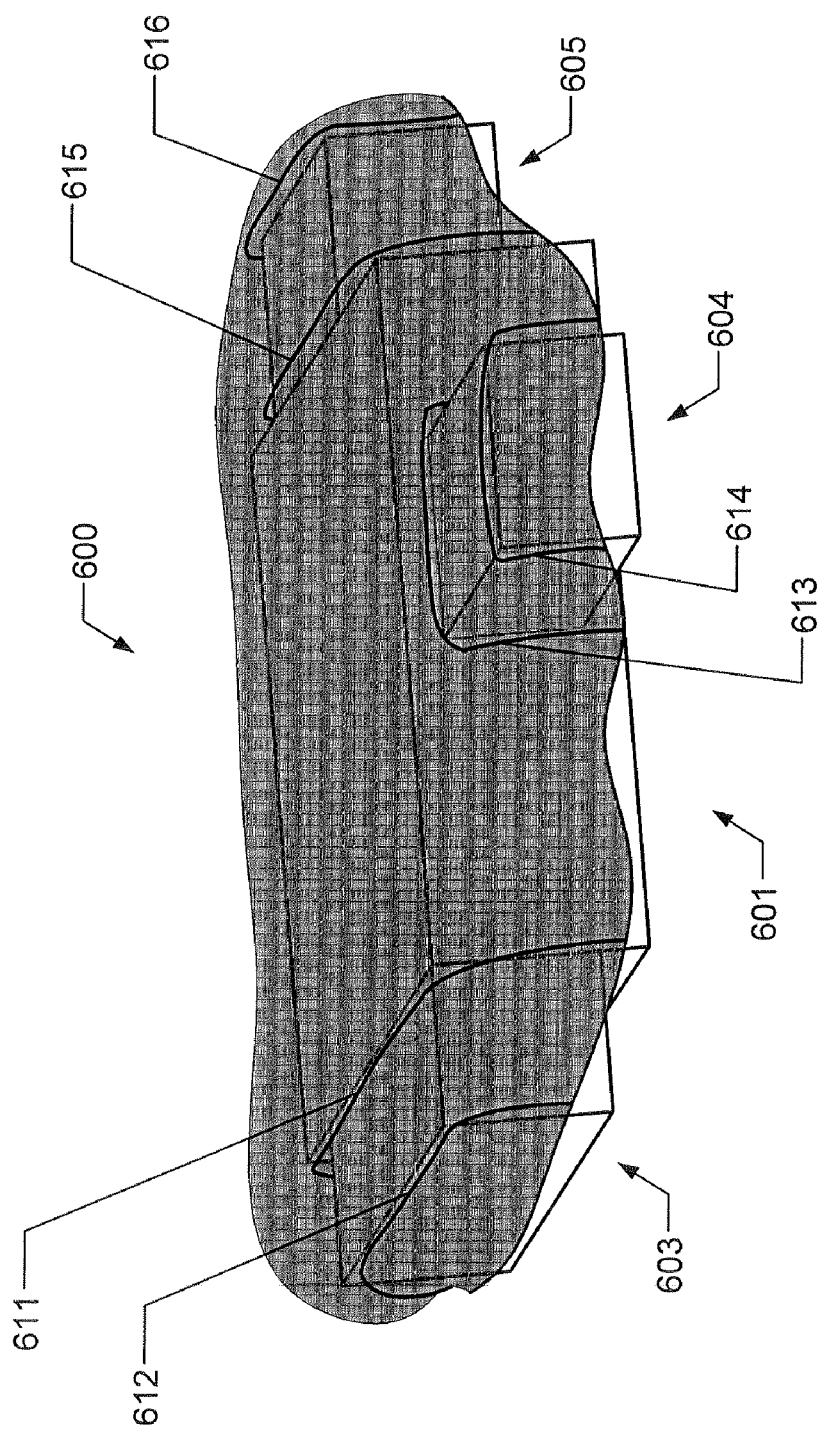
FIG. 6 is an exemplary depiction of a general apparatus with one or more various configurations covered by an adjustable cover in accordance with exemplary embodiments of the invention.

It is reiterated that the foregoing discussion of the exemplary adjustable cooking equipment cover 200 and the alternate configurations 300, 400, 500 merely provides one set of examples of an adjustable cooking equipment cover in accordance with exemplary embodiments of the invention. In that regard, many other exemplary embodiments of an adjustable cover are possible, as will be appreciated by one of ordinary skill in the art in light of the description herein. Moreover, it will be appreciated, based on the description herein, that the characteristics of the adjustable cooking equipment cover described above can be expanded to apply to an adjustable cover for many other items (apparatuses, devices, systems, etc.). For example, an adjustable cover in accordance with exemplary embodiments of the invention may be configured to cover items such as furniture, appliances, automobiles, etc. that have multiple configurations (e.g., various types, styles, shapes, sizes, add-on components, etc.). In that regard, FIG. 6 is an exemplary depiction of a general apparatus 601 that has various configurations (e.g., based on one or more various additional components 603-605) covered by an adjustable cover 600 in accordance with exemplary embodiments of the invention.

The exemplary apparatus 601 may have a first configuration that does not include any of the additional components 603-605, a second configuration that includes one of the add-on components (e.g., 603), a third configuration that includes two of the add-on components (e.g., 603, 604), a fourth configuration that includes all of the add-on components 603-605, and so on. Accordingly, the exemplary adjustable cover 600 may include one or more connectors 611-616 that are attached (embedded, integrated, connected, etc.) to one or more materials that form the cover 600. These connectors 611-616 can be used to reconfigure the adjustable cover 600 to appropriately fit one or more configurations of the exemplary apparatus 601, such as those described above. For example, the connectors 611, 612; 613, 614; and 615, 616, respectively, can be connected so that the exemplary adjustable cover 600 can appropriately fit the first configuration of the exemplary apparatus 601. As another example, the connectors 613, 614 and 615, 616, respectively, can be connected, and the connectors 611, 612 can disconnected so that the exemplary adjustable cover 600 can appropriately fit the second configuration of the exemplary apparatus 601 (which includes the additional component 603). As yet another example, the connectors 615, 616 can be connected, and the connectors 611, 612 and 613, 614, respectively, can be disconnected so that the exemplary adjustable cover 600 can appropriately fit the third configuration of the exemplary apparatus 601 (which includes the additional components 603, 604). As a final example, the connectors 611, 612; 613, 614; and 615, 616, respectively, can all be disconnected so that the exemplary adjustable cover 600 can appropriately fit the fourth configuration of the exemplary apparatus 601 (which includes the additional components 603, 604, 605).

Similar to the adjustable cooking equipment cover 200 and various alternate configurations 300, 400, 500 discussed above with respect to FIGS. 2A-5, the adjustable cover 600 is typically constructed of one or more materials that allow the cover 600 to be reconfigured to fit various configurations of an item (apparatus, device, etc.), such as the exemplary general apparatus 601. For example, the adjustable cover 600 can be constructed of one or more materials that are generally flexible in nature such as cloth-based, plastic-based, paper-based, and/or metallic-based materials. Furthermore, such materials may be natural and/or synthetic in nature.

Similar to the connectors 203-207 described above with respect to FIGS. 2A-5, the connectors 611-616 may be any item, apparatus, device, system, etc. that can be used to reconfigure one or more sections of the adjustable cover 600 to a different shape, size, style, etc. For example, the connectors 611-616 may include one or more connector (fastener, closure, etc.) devices such as Velcro® fasteners, snaps, buttons, zippers, hook-and-loop fasteners, ball-and-loop fasteners, ties, laces, screw-type fasteners, magnetic fasteners, reusable adhesive fasteners, track-and-channel fasteners, etc. Furthermore, the connectors 611-616 typically can be connected and disconnected repeatedly so that the configuration of the adjustable cover 600 can be changed as needed to appropriately fit various configurations of an item (apparatus, device, system, etc.), such as the exemplary general apparatus 601.

It should be understood that the foregoing descriptions merely relate to exemplary, illustrative embodiments of the invention. Therefore, it should also be understood that various modifications may be made to exemplary embodiments described herein within the scope of the invention, which will be recognized by one of ordinary skill in the art in light of the disclosure herein. For example, one of ordinary skill in the art will appreciate that an adjustable cover can be provided in accordance with exemplary embodiments of the invention that can be adjusted to fit items (apparatuses, devices, systems, etc.) that have various shapes (such as rectangular, square, circular, etc.) in light of the disclosure of exemplary embodiments herein. Furthermore, in light of the disclosure of exemplary embodiments of the invention herein, one of ordinary skill in the art will appreciate the many items (apparatuses, devices, systems, etc.) that can be used to provide connectors for the adjustable cover (e.g., 203-207, 611-616) and the various materials that can be used to construct the adjustable cover (e.g., 200, 300, 400, 500, 600).

What is claimed is:

1. An adjustable cover for a food cooker, comprising:
    a flexible material configurable in a plurality of configurations, wherein a first configuration is sized to closely cover the food cooker, wherein a second configuration is sized to closely cover the food cooker and a second piece of cooking equipment attached to the food cooker, wherein the food cooker comprises one of a grill, smoker, or portable stove, and wherein the second piece of cooking equipment comprises one of a shelf, bin, or firebox;
    a first connector attached to the flexible material; and
    a second connector attached to the flexible material operable to releasably engage the first connector;
    wherein the flexible material is arranged in the second configuration when the first connector is disconnected from the second connector and in the first configuration when the first connector is connected to the second connector.

2. The adjustable cooking equipment cover of claim 1, wherein the second piece of cooking equipment is a different type, style, shape, or size from the food cooker.

3. The adjustable cooking equipment cover of claim 1, wherein the first connector and the second connector comprise one or more snaps, buttons, zippers, hook-and-loop fasteners, ball-and-loop fasteners, ties, laces, screw-type fasteners, magnetic fasteners, reusable adhesive fasteners, or track-and-channel fasteners.

4. The adjustable cooking equipment cover of claim 1, wherein the first connector is a hook section of a hook and loop fastener and the second connector is a loop section of the hook and loop fastener.

5. The adjustable cooking equipment cover of claim 1, wherein the flexible material compromises one or more cloth-based, plastic-based, paper-based, or metallic-based materials.

6. The adjustable cooking equipment cover of claim 1, further comprising a third connector attached to the flexible material, the third connector operable to releasably engage the second connector, wherein the flexible material is arranged in the third configuration when the second connector is disconnected from the third connector.

7. A collapsible grill cover comprising:
    a first compartment having a first fastener attached thereto, wherein the first compartment is sized and shaped to substantially house a grill body; and
    a second compartment extending from the first compartment and having a second fastener attached thereto, the second fastener being releasably coupled to the first fastener, wherein the second compartment is sized and shaped to substantially house one or more of a grill shelf, grill bin, and or a grill firebox attached to the grill body;
    wherein, the second compartment collapses when the second fastener is coupled to the first fastener.

8. The collapsible grill cover of claim 7, further comprising a third compartment having a third fastener attached thereto, the third fastener being releasably coupled to the second fastener.

9. The collapsible grill cover of claim 8, wherein the third compartment collapses when the third fastener is coupled to the second fastener.

10. The collapsible grill cover of claim 7, wherein the second compartment is sized and shaped to also substantially house a grill accessory.

* * * * *